FIG. 1.

INVENTOR.
ARNOLD KOLKS

Feb. 6, 1951 — A. KOLKS — 2,540,125
BALL BEARING RECTILINEAR GUIDEWAY AND TRANSLATION DEVICE
Filed Sept. 10, 1947

INVENTOR.
ARNOLD KOLKS
BY Paul Kolisch
ATTORNEY.

INVENTOR.
ARNOLD KOLKS
BY Paul Kolisch
ATTORNEY

Patented Feb. 6, 1951

2,540,125

UNITED STATES PATENT OFFICE 2,540,125

BALL-BEARING RECTILINEAR GUIDEWAY AND TRANSLATION DEVICE

Arnold Kolks, New York, N. Y.

Application September 10, 1947, Serial No. 773,098

16 Claims. (Cl. 74—55)

This invention relates to a new and improved anti-friction guideway and to a combination including the improved guideway and means for translating rotational movements into guided rectilinear movements.

More particularly it relates to a guideway having no sliding or slipping bearing surfaces but employing an assembly of steel balls and stamped raceways arranged to permit rolling contact between the adjacent members of the assembly, and to a combination of one or more of these guideway subassemblies with a means for translating rotational movements as described above.

In the manufacture of guideways it is the practice to employ accurately machined cooperating bearing surfaces for adjacent members between which guided relative movement is to be permitted. The manufacture of these surfaces is expensive because it involves such processes as boring, grinding, reaming, polishing, etc. This is particularly undesirable for small manufacturing plants which ordinarily are not equipped for automatic mass production of finished parts. In addition to the cost of close fitting accurately machined parts, there are added disadvantages. These close fitting parts are relatively difficult to assemble and to adjust; they are accurate only when new and become inefficient when the machined surfaces wear out; and they entail considerable amounts of friction and wear between sliding and slipping surfaces, thus accelerating deterioration with use. In addition like other mechanism entailing the friction of sliding surfaces, significant amounts of power are wasted in friction. In the case of precision devices one particular disadvantage is that due to adhesion between rubbing surfaces accurate settings and resettings are difficult. Because of these drawbacks, and in particular because it has been prohibitively expensive to manufacture reliable guideways meeting high performance requirements at low cost, it has been customary in many of the arts to substitute rotating parts wherever possible for elements which otherwise should preferably move rectilinearly.

It is an object of the present invention to devise a new and improved guideway offering a minimum of friction to a guided element, i. e. maximum freedom for it in the guided direction, and a minimum of free play for that element in any direction other than the guided direction.

It is another object of this invention to devise an anti-friction guideway whose parts may be made by simple manufacturing processes from inexpensive materials, or are generally available ready-made at low cost, and are subject to easy assembly of unskilled labor.

It is another object of this invention to devise an anti-friction guideway which is free from the friction of sliding, slipping and rubbing bearing surfaces and thus is subject to minimum wear.

It is a further object of this invention to devise a novel device by combining guideway means of the kind described with means for translating rotational movement of a driving element into rectilinear movements of a driven element along the guideway with low friction losses, negligible components of movement for the driven element in other than the guided direction, high translation accuracy and high reset accuracy.

Other objects, features and advantages of this invention will become apparent to those skilled in the art from the following detailed description of the drawings, in which.

Figure 1:
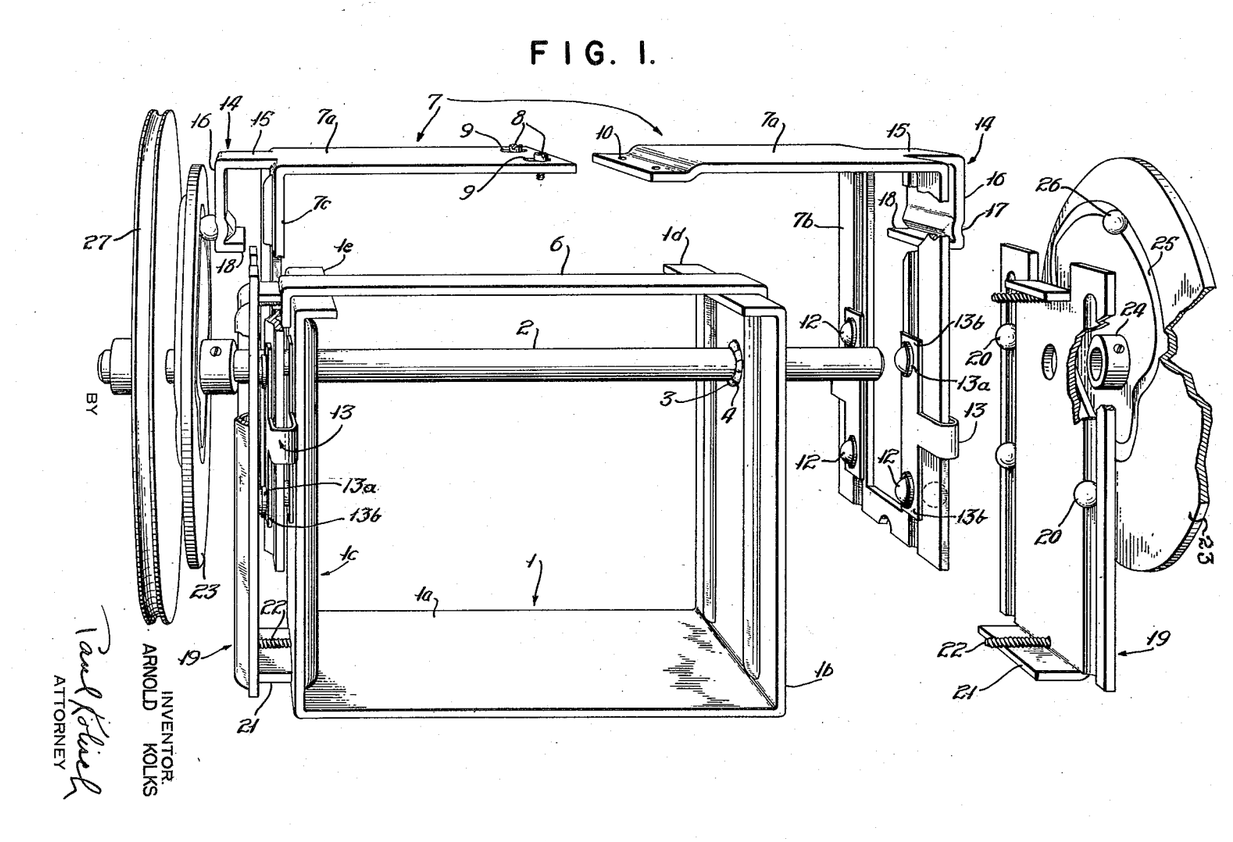
Fig. 1 is a perspective side view of a device comprising in combination, a number of improved guideways according to this invention and means for moving a driven element rectilinearly along them in accordance with rotations of a shaft. Portions are cut away and exploded more clearly to disclose details of the device.

Frame 1 of Fig. 1 consists of a sheet metal stamping having a base plate portion 1a and two upright sides, 1b and 1c, which are bent up at right angles from the base portion from opposite edges thereof. Frame 1 may be conveniently and economically formed in a power press and either by the initial pressing operation therein or by subsequent similar ones its upright sides may be formed to provide rectilinear ball raceways, shaft ball bearing annular raceways, and top-edge reinforcing lips all of which are fully described below. Similarly the base portion may be punched to provide holes suitably placed for mounting the frame in accordance with any particular intended use for the device, for example, on a radio chassis.

Figure 1A:
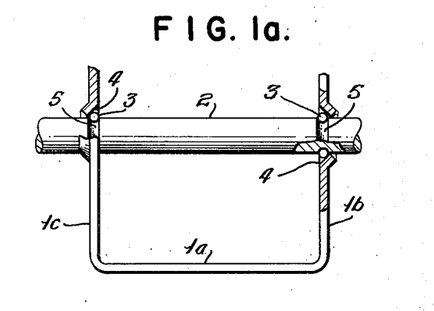
Fig. 1a is a representation of a portion of the device of Fig. 1 cut away to show how ball bearings are arranged for supporting the rotatable shaft in the frame of the device. Parts and structural details unessential for showing how they are arranged are not represented.

As can be seen from Fig. 1a a shaft 2 is supported between upright sides 1b and 1c by two sets of balls 3 seated in opposed annular raceways 4 each of which may be formed by pressing out some of the material of one of the upright sides (and punching a hole through the center thereof) to form a cuplike inner working surface of the same shape as the otuside curved surface of a short truncated cone. Shaft 2 has a groove 5 of approximately semi-circular cross section turned into its outer surface at each of the points thereof where the shaft will be supported on one of the sets of balls. In assembling shaft 2, sets of balls 3, the frame 1 the shaft is slid through ths punched out holes in the upright sides until each of its grooves is near the upright side in which it is to be supported; with the shaft held in a vertical position one set of balls is dropped between the outer surface of the shaft and the inner surface of the annular raceway whose cuplike surface is facing upward, the shaft is slid upward or downward if necessary until this set of balls falls into place in the shaft groove intended for them; while a slight force is exerted along the shaft axis to keep this set of balls captive against the cuplike surface the frame is inverted so that the other cuplike raceway faces upward; the upright sides are sprung slightly apart and while they are in this condition the other set of balls are dropped into place between the upturned free raceway and the free shaft groove in the manner described above; the upright sides are allowed to spring back to hold both sets of balls captive; tension element 6 (see Fig. 1) is slipped over the top edges of the upright sides to exert a predetermined amount of pressure to keep the shaft in true alignment but not under sufficient pressure to bind it. The tension element in addition to maintaining shaft alignment will prevent frame 1 from becoming accidentally spread to such an extent that the balls can fall out and become lost. If desired the tension element may be formed so that adjustment of tension is possible. For example, this element may consist of rod with screw threads and an adjustment nut provided at one end so that the nut could be turned along the rod as desired to provide controlled tension between the upright sides. However, where the thickness of the sheet metal used is kept within predetermined limits and where the balls are of uniform size the tension element may, as shown in the drawing, consist of a flat strip of metal with its ends bent over at right angles to form retaining surfaces spaced from each other by a predetermined fixed distance.

As will be fully described below tension element 6 may be held in its position across the top edges of frame 1 by screws which play a part in holding together other elements of this device.

Each of the upright sides 1c and 1b has two rectilinear raceways pressed into its outer surface. The axes of the raceways on an upright side are parallel to each other and perpendicular to base plate portion 1a and in each upright side one of the rectilinear raceways is located on each side of the hole therein through which shaft 2 passes. Preferably the raceways may have V-shaped cross sections with 90° spread between the arms forming the V.

For certain applications it may be advantageous to polish the flat converging surfaces of the raceways or to harden them by tempering, heat treatment, or chromium plating. However, for many applications a high standard of performance will be achieved without any processing after the pressing operation. Applicable smoothing and hardening of certain sheet metals in the area of a press can be achieved inexpensively in the pressing operation itself by using dies and pressure appropriate to cause an appreciable flowing and compressing of the metal in the press. As is seen in Fig. 1 a small portion of the material at the top of each of the upright sides is bent over at right angles to form top-edge reinforcing lips 1d, 1e for the upright sides. It will be apparent after a full description of this invention that for applications where unusually accurate performance is required the stiffening effect of the reinforcing lips will serve an obvious good purpose.

An elevator element 7 consists of two halves, a front half and a rear half. The two halves are joined by a pair of screws 8 which pass through elongated holes 9 in the front half and engage threads 10 in the rear half. This arrangement not only simplifies assembling of the device but as will be described below it permits independent adjustment of the front and rear guideways. When the halves are joined together elevator element 7 comprises a top platform portion 7a (consisting of two halves which are fastened together by screws 8) and two guided sides 7b and 7c which are bent downward at right angles from the platform portion from opposite edges thereof. The platform portion as measured between the outside edges of the top ends of the guided sides is wider than the corresponding dimension of base portion 1a by an amount approximately equal to twice the thickness of the sheet material used in forming elevator element 7 plus twice the thickness of the sheet material used in forming frame 1 plus twice the amount of space maintained between each of the guided sides and the upright side cooperating with it by polished balls which are placed between them in a manner to be disclosed below.

When the elevator element is so proportioned with respect to the frame it will fit over the frame; its guided sides will fit around the upright sides of the frame; and the polished balls, whose installation will be described below, will fit between them in opposed raceways under appropriate pressure so that the elevator element will be movably mounted on the frame on rolling supports. There is punched out of each of the guided sides a centrally located opening extending along enough of its length so that, even when shaft 2 is assembled in frame 1 with each of its ends extending beyond the outside surface of one of the upright sides, the elevator element can be assembled over the frame with the shaft ends protruding through these openings and will be free to move up and down without being impeded by the shaft ends even though they extend through the guided sides. This punched out opening is wider than the shaft diameter but narrower than the distance between the rectilinear raceways on the upright sides. This leaves solid material on each of the guided sides into which there are pressed parallel raceways spaced from each other by the same distance as that between the rectilinear raceways on each of the upright sides of frame 1. These raceways which also are rectilinear are pressed into the inner surfaces of the guided sides, i. e. the surfaces of the elevator element which face each other. In addition to being parallel to each other and these raceways are perpendicular to top platform portion 11 and, for each guided side, one of the raceways is formed in the material remaining on each side of the central opening after it is punched out. These raceways have the same cross sectional shape as described above for those in the upright sides.

In adding the elevator element 7 to the subassembly comprising frame 1, shaft 2, sets of balls 3, and tension element 6, the screws 8 are first removed to take apart the elevator element and then each of the elevator halves is added to the subassembly with a shaft end passing through the punched out opening in its guided side and with the raceways in that side registered and in alignment with the raceways of the upright side supporting that shaft end; two polished steel balls 12 are inserted between each pair of raceways thus aligned within loosely fitting retainer holes 13a in one of the tabs 13b of a spacer cage 13 (one of which had previously been slipped over each of the edges of each guided side with one of its tabs against its inside surface and the other against its outside surface); the guided sides are pressed firmly toward each other and against the upright sides to hold the steel balls captive between the aligned raceways; and screws 8 are set in place and tightened to maintain this pressure until a later final adjustment of the whole device.

Each of the halves of the elevator element includes a lug 14 by which elevator element 7 may be driven upward or downward in the guided direction. As can be seen from Fig. 1 each of the lugs may be formed of a portion of the material punched out from each of the guided sides in forming the punched out opening therein. This portion of the material is shaped by the same or a subsequent pressing operation so that it comprises an extension 15 which may be in the same plane as top platform portion and which extends outward beyond the plane of the guided side and a lug portion 16 bent down at right angles from the end of extension 15 to provide a surface parallel to that of the guided side in which there is formed a short transverse raceway 17. The cross section of this raceway may be similar to that of the rectilinear raceways already described herein and it extends in a direction crosswise to the direction of the rectilinear raceways of the upright sides and the guided sides. A lip 18 may be formed at the end of each lug portion 16 to reinforce the lug and the raceway.

There are two pressure plates 19. Each of them consists of a sheet metal stamping of about the same size and shape as an upright side and has a hole punched through it in a position corresponding to the location of the annular raceway in an upright side. This hole in each plate 19 is large enough to permit the plate to be assembled against a guided side with a shaft end protruding through the hole without binding in it. Two rectilinear raceways are stamped in the pressure plate parallel to each other and parallel to the upright edges of the pressure plate. As can be best seen from Figs. 1 and 1b a number of polished steel balls 20 similar to the balls 12 mentioned above are used to produce rolling relative motion between each pressure plate and the guided side with which it cooperates. Unlike the balls 12, however, the balls 20 are not captive between two opposed V-raceways. Each ball 20, while it is captive on one side in a V-raceway in that surface of a pressure plate into which its V-raceways were pressed, is held in place on its other side by impinging upon the surface of a guided side opposite to that into which its V-raceways were pressed. The metal pressed back to form a V-groove on the front surface of a guided side forms an inverted V protrusion on its back surface and this protrusion has a shoulder upon which polished steel balls 20 may conveniently bear and along which they will be free to roll.

Figure 1B:
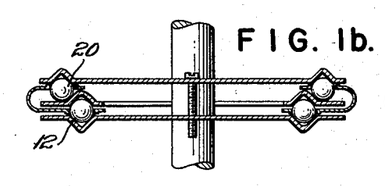
Fig. 1b is a representation of a cross section of one of the upright end assembles of the device of Fig. 1 to show the arrangement of steel balls and stamped raceways by which said assembly is made to comprise a guideway. Parts and structural details unessential to this showing are not represented.

Though each individual ball 20 thus rides against but a single bearing surface on the back of a guided side, i. e. against one shoulder of an inverted V-protrusion instead of between two walls as in a V-shaped groove, nevertheless opposed different ones of the balls 20 bear on shoulders which face away from each other and, therefore, good guiding action results.

Figure 1C:
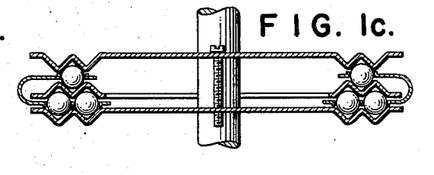
Fig. 1c is a representation of a cross section of an alternate type of upright end assembly suitable for a device like that of Fig. 1 in which a different arrangement of steel balls and stamped raceways is employed to form each guideway.

However, Fig. 1c illustrates an alternate arrangement for the raceways by which the balls 20, as well as the balls 12, are captive between V raceways impinging on them from two opposite sides. This arrangement has an additional advantage that a set of dies suitable for stamping raceways into the upright sides and the guided side may also be used for stamping raceways into the pressure plate. Moreover, this arrangement permits the use of a larger number of the balls 12 and thus provides an increased total bearing area. Raceways, as shown in Fig. 1c, are formed in pairs of V-grooves, each groove of each pair being parallel to and adjacent to the other one so that together they have a W-shaped cross section on the pressed-in side and an inverted W-shaped cross section on the opposite side. Obviously, a W-cross section includes two V-cross sections and an inverted W-cross section includes a V-cross section. Therefore, by reversing each pressure plate in assembling the device so that its rear surface faces the rear surface of a guided side, registered V-grooved raceways will be afforded between which sets of balls 20 may be inserted and held captive.

Where maximum manufacturing economy is desired the pressure plate may be made flat, i. e. without any pressed-in raceways. Each of the balls 20 will be captive in a retainer 13a of a spacer cage 13 (which in turn will itself be captive to a guideway assembly by a pair of the balls 12). Because each of the balls 20 is thus captive it will roll along a straight line pathway on the front surface of a pressure plate, even though it is not running in a groove, because it will be guided in that direction by the spacer cage holding it. Moreover, by properly adjusting the position of each tab 13b which is retaining balls 20, each ball 30 can be made to impinge on a flat portion of the rear surface of the upright side rather than against a shoulder of a pressed-out protrusion thereon so that the ball will roll between parallel flat surfaces, one afforded by the back of the guided side and the other afforded by the surface of a pressure plate which faces it.

At the top and bottom of each of the pressure plates there is a turned over spacer 21 of such width that the pressure plate can be rigidly screwed to an upright side without crushing any of the steel balls 12 or 20; without forcing any of the balls into the material comprising an upright side, a guided side, or a pressure plate; and without bending any of these component parts. Screws 22 pass through holes at the top and bottom of each of the pressure plates near the spacers and engage threads in the upright sides so that pressure plates can be drawn into firm union with the upright sides, i. e. can be drawn against the upright sides until stopped by impingement of the spacers. The screw 22 at top of each pressure plate passes through a hole in a bent over end of tension element 6 before engaging the threads provided in an upright side. Tension element 6 is thus held in its proper place on the top edges of the upright sides.

There are two cams 23 each of which consists of substantially circular sheet metal stamping connected to a collar 24, or other suitable element for clamping the cam in place on shaft 2, and has a cam raceway 25 stamped into its inner surface. Each cam raceway, which, like the rectilinear raceways, may have a V-shaped cross section, follows on the inner surface of its cam, a path successive points of which are progressively nearer to the imaginary center point of the cam collar, or farther away from it depending upon the portion of the raceway on which such points are located as well as the direction in which they are successively considered along that portion. A preferred shape for the path of a cam raceway is that of the conventional art device used to represent a heart. Assuming a fixed reference line which is initially registered with a heart-shaped cam so as to divide it into two symmetrical halves, rotation of such a cam for a first 180° from such a reference line will either progressively move the point of intersection of this line with the cam path away from or toward the center of the cam collar and rotation of the cam for the remainder of one complete revolution, i. e. for a second 180°, will progressively move said point of intersection conversely, i. e. toward or away from the center of the cam collar. Thus, it is seen that if this kind of a cam is employed to drive an element in a rectilinear guided direction, that element will reciprocate as the cam is continuously rotated. Moreover, as can be mathematically demonstrated, if a cam which has an appropriately curved heart-shaped path is rotated at a uniform angular rate about a center of rotation appropriately located on a line dividing the heart into two symmetrical halves, a straight line measurement from the center of rotation to the cam raceway along a fixed angular reference line will become progressively longer or shorter as the cam is rotated and will do so at a constant rate of change. In other words when its heart-shaped cam raceways are appropriately shaped with reference to an appropriate center of rotation a device according to this invention will translate rotary motion into rectilinear motion in a linear manner.

Where maximum manufacturing economy is desired the cam pathway may be a circle with its center offset with respect to the center of the cam collar. A die for pressing such a cam pathway can be inexpensively turned out on an ordinary lathe and this will permit considerable economy. The linear translation described above will not be achieved however. Rather than this the rate of change will vary in a manner which can be predetermined. For certain purposes this will be beneficial and for others it will not.

As will be described below lug 14 may be formed to contain a ball socket or recess instead of a transverse raceway. This alternate type of lug is particularly suitable where it is desired to rotate the cam continuously as a socket will not permit transverse creep of the ball such as would occur in a transverse raceway. And obviously for embodiments which do employ a transverse raceway for lug 14 nothing will be lost if the cam pathway does not follow an endless curve (does not permit continuous rotation).

It is also possible for the cam to have a spiral pathway so that a number of complete revolutions of the cam are required for it to drive a driven element in a rectilinear direction for a predetermined distance. This type of construction is particularly suitable where vernier action is desired.

In assembling the cams to the device of Fig. 1 the cam collars are passed over opposite shaft ends with the cam raceways facing each other and with their patterns similarly oriented angularly. While a steel ball 25 is held in position between the lug transverse raceway (or ball socket) and the cam raceway each cam is slid along the shaft in the direction of a lug 14 until said ball becomes captive between them and is under sufficient pressure to eliminate lost motion crosswise to either of the raceways holding it. The pressure should not be great enough to bend the cam or bind the moving parts. For embodiments in which the lug has a socket or recess rather than a transverse guideway it will be preferable to avoid pressure great enough to prevent the ball from slipping around in the socket, i. e. a lug socket will not afford rolling contact and therefore a significant amount of friction can be produced by excessive pressure. In such cases accurate formation of the socket surface and the use of a lubricating material will have obvious advantages.

In Fig. 1 a drive pulley 27 is shown attached to one end of shaft 2. It has a recess formed around its edge into which a string (not shown) may be inserted in a known manner for rotating the pulley under control of a knob and shaft (not shown) about which it is customary to wrap enough turns of the string to provide friction drive from the shaft to the string which in turn may drive pulley 27. Neither the particular pulley 27, either alone or with particular cooperating drive elements, nor any other particular type of drive for shaft 2 is an essential part of this invention. This pulley is shown merely to illustrate that shaft 2 can have rotary motion imparted to it from an external source and to show one convenient way of doing so. In operation shaft 2 is rotated by a driving force, thus turning cam 23 and causing ball 26 to roll between the cam raceway and the lug raceway. It is readily demonstrable that a ball which is under pressure between two plates and rolls without slippage between two V-grooves therein, providing each of the grooves has ball bearing walls which converge at the same angle (so as to subtend equal arcs on the ball's spherical surface), will move along each V-groove with respect to each plate, a distance equal to one half of that by which the two plates move with respect to each other in rolling the ball. Because of this the cam can be rotated to move a point on its cam raceway for a distance (with respect to a reference point) substantially equal to twice the length of the transverse raceway in lug 14 before the ball will have crept along the transverse raceway from one of its ends to the other. If, for two otherwise identical embodiments, different amounts of angular rotation of the cam are required the transverse raceway of the one for which the larger amount of rotation is required should be longer from that of the other. Where the width of the punched-out portion of a guided side does not provide sufficient material for a transverse guideway of a desired length, a transverse guideway of the necessary length can be made from other material, for example, as a separate stamping, die casting, or the like. A guideway thus separately formed may be attached to the lug by any convenient means. Should it be desired to employ a narrow lug with a relatively short transverse raceway stamped into it with less limitation of permissible angular rotation of the cam than that described above, this can be done by forming the transverse raceway with its sides converging at an angle substantially less than the angle of convergence of the sides of the cam raceway. By doing this the cam ball will roll in the transverse raceway on contact circles having smaller radii than those of the contact circuits upon which it rides in the cam raceway. Therefore, the distance it will creep along the transverse raceway will be less than the distance it will roll along the cam raceway. However, even this will not permit continuous rotation. Therefore, as indicated above, where it is desired to permit continuous rotation of the cam, a socket or recess such as shown in Fig. 1e should be employed instead of a transverse raceway. The obvious reason for this is that the cam ball, when it is seated in such a socket, is not transversely displaced at all by cam rotation. It is obvious that as the cam is rotated and the cam ball is made to roll along the cam raceway, the ball will occupy successive positions which lie either nearer to or farther from the shaft axis in accordance with variations in the raceway path. Since the ball is captive in the transverse raceway, elevator element 7 will be driven by lug 14 nearer to or farther from shaft 2, thus elevating or lowering top platform portion 7a. Since the various guideway elements are assembled under pressure and are virtually noncompressible, this movement in the guided direction will be accompanied by a minimum of movement in any other direction.

In the final assembly of this entire structure screws 8 are loosened, screws 22 are drawn up securely, and screws 8 are tightened again.

Figure 1D:
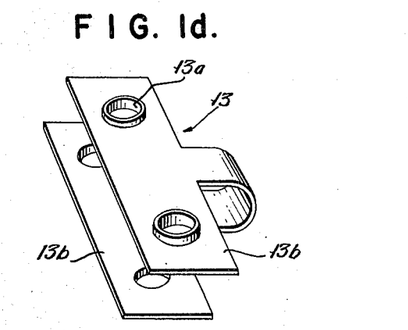
Fig. 1d is an isometric view of one of the component elements of the device of Fig. 1.
Figures 1E, 3, 4:
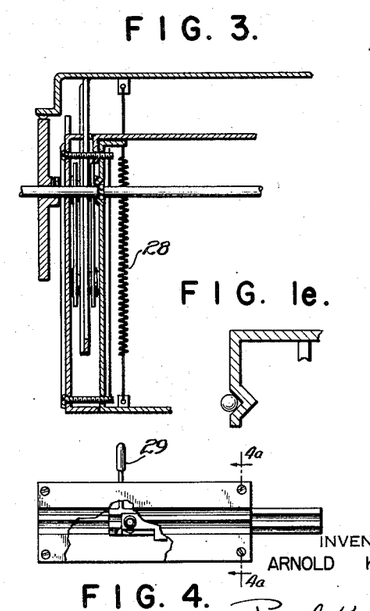
Fig. 1e is a sectional view of an alternate type of lug (element 14) for a device like that of Fig. 1.
Fig. 3 is a sectional view of a portion of the device of Fig. 2 taken along the line 3—3 to disclose the coaction between the cam and the driven element.
Fig. 4 is a representation of a top view of an improved anti-friction guideway according to the present invention with a portion of its top pressure plate cut away.

Fig. 1d shows one of the spacer cages. They may be formed of thin sheet material which is softer than the material (such a steel) of which the balls 20 and 12 are made. Each spacer lug consists of two tabs 13b joined together by a U-shaped strap. Each tab has two ball retainers 13a punched and pressed through it. These retainers preferably have short retaining walls formed perpendicularly to the tab surface to present wider retaining surfaces than could be afforded by the thickness of the material from which the tabs are formed. The presence of these walls will reduce any tendency of the balls to ride over the edge of a retainer hole and climb out of the retainer when the elevator element is moved up and down. These short walls may be conveniently formed by the same stamping operation by which the tabs are cut out and the retainer holes punched through. If desired, of course, thicker material may be used to avoid the need for retaining walls other than those afforded by the sides of the retainer holes themselves.

Figure 2:
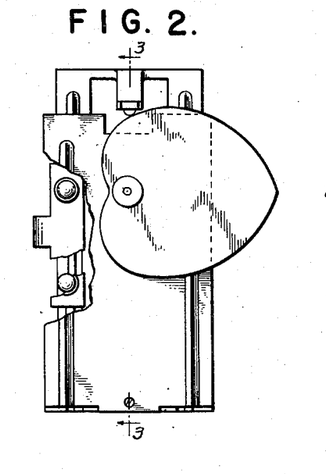
Fig. 2 is a representation of a front view of an alternate embodiment of the invention shown in Fig. 1 in which a different type of cam is employed for imparting rectilinear movement to a driven element.

Fig. 2 shows an alternate embodiment in which a different type of cam is employed for imparting rectilinear movement to the elevator element. The guideway subassemblies of this embodiment need not be described in detail since, as can be seen from Figs. 2 and 3, they are substantially the same as those of the embodiment of Fig. 1 which have been fully described above. In the embodiment of Fig. 2, however, an operating cam surface is formed on the edge of each cam rather than in its front surface and, accordingly, the lug is formed to rest against this edge cam surface. If a polished steel ball is peened into the portion of the lug which faces said cam surface it will offer an inexpensive smooth operating and slow wearing surface. From a given starting angular position, if the cam is turned in one direction, the cam itself will impart force to the lug to raise elevator element 7. Force for lowering element 7 is provided by a spring. Spring 28 is connected between base portion 1a and top portion 7a under sufficient tension to draw these elements together so that the lug will rest against the cam edge at all times (i. e. will rest there for any rotational position of the cam). From the same starting angular position, if the cam is turned in the opposite direction its cam surface will tend to recede from the lug. This will permit spring 28 to draw elevator element 7 downward with the lug in continuous contact with the cam surface at a point of contact which moves progressively nearer and nearer to the shaft axis. It is evident that when the cam is turned to move the elevator element upward spring 28 is progressively loaded and that in returning the elevator element to its low position spring 28 again becomes unloaded except that at the lowest position of element 7 the initial tension applied in installing the spring will remain.

Figure 4A:
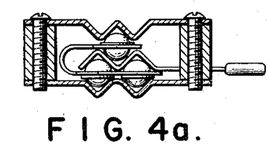
Fig. 4a is a cross-sectional view of the guideway of Fig. 4 taken along the line 4a—4a and drawn on a larger scale than Fig. 4.

Because of the foregoing description of the guideway portions of the device of Fig. 1 and of the alternate form of raceway arrangement using grooves of W-shaped cross section, see Fig. 1c, the embodiment shown in Figs. 4 and 4a requires no further description. In this embodiment there are two fixed elements, one of which may be considered as corresponding to an upright side of that device. The important fact is that there are two fixed elements connected together with a movable guided element retained between them, in the manner shown, by raceways stamped in the fixed elements and the movable element and by balls cooperating with them in a manner already fully explained. The purpose of this embodiment is to guide along a predetermined axis motion imparted to the movable element from a source of mechanical force which may exert components of force in other directions than the guided direction. For example, though the handle 29 may be pushed generally in a leftward and rightward direction in Fig. 4 by a driving force including components downward and inward in the drawing, the action of the guideway will be to cause movement only along the guideway axis with little friction and negligible deviation.

Figure 5:
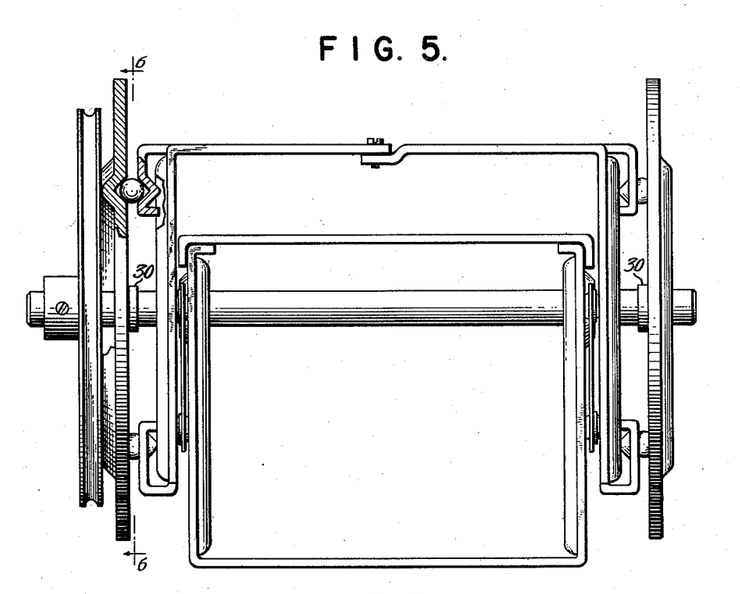
Fig. 5 is a side view of a simplified embodiment of the invention shown in Fig. 1 in which each of the cams serves also as a pressure plate. One of the cams is partly cut away.

Fig. 5 is an alternate embodiment of a device such as that of Fig. 1 in which each of the cams is adapted to serve a function as a pressure plate. As can be seen each of the guided sides comprises a second lug which corresponds to the lug 14 of Fig. 1e and is located at the bottom edge of the guided side. Since a cam ball is captive above shaft 2 between a cam raceway and a ball recess or socket and a second cam ball is similarly captive below the shaft, this structure provides a way of exerting substantially balanced pressure against the outside surface of each guided side to press it toward the upright side with which it cooperates so as properly to engage the balls 12 captive between these elements.

Figure 6:
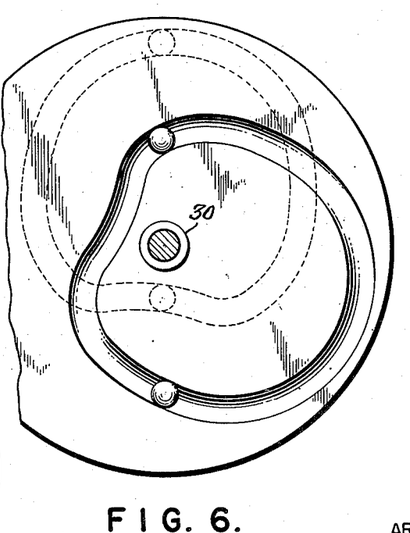
Fig. 6 is a sectional view of the device of Fig. 5 taken along the line 6—6 to show one suitable pathway for the cam groove. A ghost image is shown superimposed on this view to illustrate how the two cam balls remain equidistant from each other as the cam is rotated.

Fig. 6 shows a cam raceway suitable for the embodiment of Fig. 5. This raceway has a modified heart shape and this figure illustrates the fact that if a line is drawn through the center of the shaft and intersects the cam raceway on opposite sides of the shaft, the distance between the two points of intersection with the raceway will be constant irrespective of the angular position of said line. Therefore, though there is a fixed distance between the centers of the sockets, this will not prevent the desired coaction between a cam and a guided side, i. e. coaction including the exertion of pressure by the cam upon the guided side and the transmission of mechanical movement from the cam to the guided side.

Figure 7:
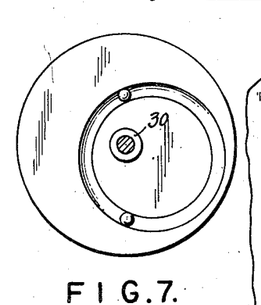
Fig. 7 shows a circular pathway for the cam groove that may alternatively be used in the embodiment of Fig. 5.
Figure 8:
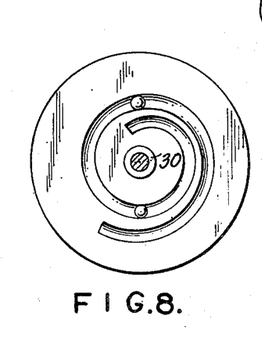
Fig. 8 shows a spiral pathway for the cam groove that may alternatively be used in the embodiment of Fig. 5.

Fig. 7 shows a circular cam raceway and Fig. 8 a spiral cam raceway that may be substituted in the embodiment of Fig. 5 for the heart-shaped cam raceway of Fig. 6.

In the embodiment shown in Fig. 5 an alternate arrangement is shown for installing the cams on shaft 2. In this embodiment there are two collars 30 on shaft 20. They may either be turned out directly on the shaft or pressed on to it; they may be held on the shaft with set screws; or they may comprise C rings snapped about the shaft in grooves cut into the shaft for the purpose of receiving them. In assembling this device the cams are pressed over the shaft ends, for example in an arbor press, to force them along the shaft until they bear against the collars. This construction facilitates mass production by unskilled labor and avoids the necessity of collars attached to the cams. The positions of the collars 30 can be calculated in advance so that when the device is assembled the cams will exert the desired amount of pressure between the various elements comprising raceways and balls.

Embodiments have been described herein as made of sheet metal stampings because this economical form of construction is conveniently available according to the nature of this invention. Nevertheless it is obvious that the various elements herein may comprise guideways which are formed in any of a number of ways. The upright sides, guided sides and pressure plates may be machine finished parts if desired or may be die cast. Likewise the annular raceways for carrying sets of balls to support shaft 2 may be formed as separate machined parts and then pressed into or otherwise attached to the upright sides. Likewise, the cams may consist of material into which the cam raceways have been machined rather than pressed.

It is also obvious that it is not essential for a device of the kind shown in Fig. 1 that a cam be provided at each end of the device. Instead, for certain applications where extreme rigidity is not required, a single cam drive could be employed. For such an embodiment shaft 2 could be made to terminate at a point a short distance inside of upright side 1b and could be supported at that point in a known manner by a set screw screwed through the upright side and arranged to force a single polished ball between a first conical recess in the end of the shaft and a second conical recess in the end of the set screw, the two recesses facing each other. Such a set screw, of course, would also make it possible to adjust the pressure on the set of balls 3 in the annular raceway 4 of upright side 1c by turning the set screw rather than by any manipulation of the tension member.

What I claim is:

1. A device for translating rotary movement into rectilinear movement including an antifriction guideway comprising two relatively fixed elements connected together with inner surfaces facing each other, each fixed element having on its outer surface a plurality of straight raceways all parallel to a guided axis of the guideway, a relatively movable element surrounding the fixed elements and having raceways on its surfaces also parallel to said axis and registering with the raceways of the fixed elements, and polished balls captive between the registering raceways, a shaft, a shaft bearing connected to the fixed elements for rotatably supporting the shaft with respect thereto, an element connected to said shaft and having a surface which is substantially perpendicular to the axis of the shaft and substantially parallel to each of the raceways and to said axis, a cam raceway formed in said surface of said element along a pathway thereon having points at different distances from the center of the shaft, the movable element comprising a lug including a ball recess facing said surface of said element, and a polished cam ball captive between the cam raceway and said recess.

2. A device for translating rotary movement into rectilinear movement including an antifriction guideway comprising two relatively fixed elements connected together with inner surfaces facing each other, each fixed element having on its outer surface a plurality of straight raceways all parallel to a guided axis of the guideway, a relatively movable element surrounding the fixed elements and having raceways on its surfaces also parallel to said axis and registering with the raceways of the fixed elements, and polished balls captive between the registering raceways, a shaft, a shaft bearing connected to the fixed elements for rotatably supporting the shaft with respect thereto, an element connected to said shaft and having a surface which is substantially perpendicular to the axis of the shaft and substantially parallel to each of the raceways and to said axis, a cam raceway formed in said surface of said element along a pathway thereon having points at different distances from the center of the shaft, the movable element comprising a lug including a transverse grooved raceway extending crosswise to said axis and parallel to and facing said surface of said element, and a polished cam ball captive between the cam raceway and the transverse raceway.

3. A device for translating rotary movement into guided rectilinear movement comprising at least two anti-friction guideways each including two relatively fixed elements connected together with inner surfaces facing and urged towards each other, a relatively movable element surrounding the fixed elements with and having two opposite surfaces respectively facing the outer surfaces of the fixed elements, straight raceways in at least one of said opposite surfaces and at least one of said outer surfaces, all of the raceways being parallel to a guided axis of the guideway and each individual raceway registering with a raceway in a surface facing it, polished balls captive between each outer surface and the opposite surface facing it, the balls being under pressure exerted by the connection which urges together said inner surfaces, and at least some of the balls being captive between registering raceways, a base portion connected to at least one of the fixed elements of each guideway so that all of their raceways are parallel to each other and perpendicular to the base portion, a platform portion connected to the movable elements of the guideways substantially perpendicular to all of the raceways thereof, a shaft, at least one shaft bearing connected in a fixed position with respect to the base and rotatably supporting the shaft, an element connected to the shaft and having a surface substantially parallel to all of said raceways and perpendicular to the shaft axis and to said base and platform portions, a cam raceway formed in the surface of said element along a path thereon having points unequally distant from the center of the shaft, a lug attached to one of the movable elements and containing a ball recess facing said surface of said element, and a polished cam ball held captive between the cam raceway and said recess, whereby rotational movements of the shaft apply force to said movable element over said cam raceway, said polished cam ball, and said lug, and whereby said force will be effective to move the movable elements and the platform portion attached thereto only in a direction along the guided axis.

4. A device for translating as in claim 3, in which the anti-friction guideways and the base and and the platform portions together form a four-sided boxlike structure with two open sides, the base and the platform portions comprising a pair of opposed closed sides and two guideways comprising another pair of opposed closed sides, there are two bearings one formed in a fixed element of one of the guideways and another formed in a fixed element of the other, the shaft is supported parallel to both the base and platform portions and has ends which extend beyond the pair of sides comprising the two guideways, one of said elements having a surface attached to each end of the shaft outside of the boxlike structure and there is one of said lugs attached to the movable element of each guideway with its recess facing one of said cam raceways and there are two cam balls each captive between a cam raceway and a recess, whereby said effective force will be transmitted to the platform by the movable elements of both guideways.

5. A device for translating rotary movement into guided rectilinear movement comprising at least two anti-friction guideways each including two relatively fixed elements connected together with inner surfaces facing and urged towards each other, a relatively movable element surrounding the fixed elements and having two opposite surfaces respectively facing the outer surfaces of the fixed elements, straight raceways in at least one of said opposite surfaces and at least one of said outer surfaces, all of the raceways being parallel to a guided axis of the guideway and each individual raceway registering with a raceway in a surface facing it, polished balls captive between each outer surface and the opposite surface facing it, the balls being under pressure exerted by the connection which urges together said inner surfaces, and at least some of the balls being captive between registering raceways, a base portion connected to at least one of the fixed elements of each guideway so that all of their raceways are parallel to each other and perpendicular to the base portion, a platform portion connected to the movable elements of the guideways substantially perpendicular to all of the raceways thereof, a shaft, at least one shaft bearing connected in a fixed position with respect to the base and rotatably supporting the shaft, an element connected to the shaft and having a surface substantially parallel to all of said raceways and perpendicular to the shaft axis and to said base and platform portions, a cam raceway formed in the surface of said element along a path thereon having points unequally distant from the center of the shaft, a lug attached to one of the movable elements and containing a transverse grooved raceway extending crosswise to the shaft axis and parallel to and facing said surface of said element, and a polished ball captive between the cam raceway and said transverse raceway.

6. A device for translating as in claim 5, in which the antifriction guideways and the base and the platform portions together form a four-sided boxlike structure with two open sides, the base and the platform portions comprising a pair of opposed closed sides and two guideways comprising another pair of opposed closed sides, there are two bearings one formed in a fixed element of one of the guideways and another formed in a fixed element of the other, the shaft is supported parallel to both the base and platform portions and has ends which extend beyond the pair of sides comprising the two guideways, one of said elements having a surface attached to each end of the shaft outside of the boxlike structure and there is one of said lugs attached to the movable element of each guideway with its transverse raceway facing one of said cam raceways and there are two cam balls each captive between a cam raceway and a transverse raceway, whereby said effective force will be transmitted to the platform by the movable elements of both guideways.

7. A device for translating as in claim 3, in which said fixed and said movable elements are of sheet material deformable by stamping and said bearing comprises an annular raceway stamped and punched into one of the fixed elements, a circumferential ball bearing groove cut into the shaft at the point where it is supported by said bearings, and a row of balls seated in the annular raceways between an inner surface thereof and said ball bearing surface.

8. A device for translating as in claim 3, in which the anti-friction guideways and the base and the platform portions together form a four-sided boxlike structure with two open sides, the base and the platform portions comprising a pair of opposed closed sides and two guideways comprising another pair of opposed closed sides, there are two bearings one formed in a fixed element of one of the guideways and another formed in a fixed element of the other, the shaft is supported parallel to both the base and platform portions and has ends which extend beyond the pair of sides comprising the two guideways, one of said elements having a surface attached to each end of the shaft outside of the boxlike structure, there is one of said lugs attached to the movable element of each guideway with its recess facing one of said cam raceways and there are two cam balls each captive between a cam raceway and a recess, said fixed and said movable elements are of sheet material deformable by stamping, each of said bearings comprises an annular raceway stamped and punched into a fixed element on a different one of two opposed closed sides of the boxlike structure, a circumferential ball bearing groove cut into the shaft at the point where it is supported by the bearing, and a row of balls seated between an inner surface of said annular raceway and said ball bearing surface, and a tension element connects the fixed elements which include the annular raceways and urges them together under pressure sufficient to hold the rows of balls captive between the inner surfaces of the annular raceways and the ball bearing surfaces of the shaft.

9. A device for translating as in claim 3, in which said cam raceway is formed along a pathway on said surface which is of substantially the shape of the conventional art device used to represent a heart.

10. A device for translating as in claim 3, in which the pathway of said cam raceway on said surface has substantially the shape of a circle whose center is offset from the axis of the shaft for a predetermined distance.

11. A device for translating as in claim 3, in which the pathway of said cam raceway on said surface has substantially the shape of a spiral with its point of origin near to the shaft axis.

12. A device for translating rotary movement into rectilinear movement including an anti-friction guideway comprising two fixed elements connected together with inner surfaces facing each other, a movable element surrounding the fixed elements with two opposite surfaces respectively facing the outer surface of said fixed elements, straight raceways in at least one of said opposite surfaces and at least one of said outer surfaces, a shaft, cam means connected to said shaft and having a surface perpendicular to the axis of the shaft, an off center raceway formed in the surface of said cam, and means for mechanically coupling the movable element and cam whereby the cam controls the movement of said movable element.

13. A device according to claim 12, and in which all of the straight raceways are parallel to the direction of the movement of the guideway and each individual raceway in alignment with a raceway in the surface facing it, and polished balls captive between the aligned raceways.

14. A device according to claim 12, and in which a lug projects from the movable element having a ball recess facing the surface of said cam means, and a polished ball whereby the rotary movement of the cam is translated into rectilinear movement of the guideway.

15. A device for translating rotary motion into rectilinear motion along a guideway comprising at least two guideways as in claim 12, a base portion connected to at least one of the fixed elements of each guideway so that their raceways are all perpendicular to the base portion, a platform portion connected to the movable elements of the guideways substantially perpendicular to their raceways, a shaft, at least one bearing connected to the base portion and rotatably supporting the shaft, a cam attached to said shaft, the cam comprising a sheet of material substantially parallel to all of the guideways and perpendicular to said shaft and formed within an eccentric edge having different points unequally distant from the center of the shaft, the edge being formed with a smooth cam surface, a lug attached to one of the movable elements and projecting over the cam surface, a spring under tension joining the base and platform portions whereby rotary movements of the shaft in one direction transmit forces to said one of the movable elements over the cam surface and the lug to drive said movable element, and with it said platform portion and said other movable portion, in a first direction along the guided axis, and rotation of the shaft in the opposite direction permits forces loaded into the spring to act to drive them in the opposite direction.

16. A device for translating rotary motion into rectilinear motion along a guided axis including a guideway comprising a relatively fixed element with an outer surface, a relatively movable element having a first surface facing said outer surface, a plurality of rectilinear raceways formed on said surfaces parallel to each other and to the guided axis, raceways on the surface facing each other being positioned to register with each other, polished balls between said surfaces in the registered raceways, a shaft, a bearing connected in a fixed position with respect to the fixed element and rotatably supporting the shaft with its axis crosswise to said guided axis, the shaft passing through the surfaces substantially perpendicular thereto and between the axes of opposed pairs of raceways which register with each other, an element attached to the shaft and having a surface perpendicular to the shaft axis and parallel to the raceways, a cam raceway formed in said surface along a path having points unequally distant from the center of the shaft, the pathway of the cam being so formed that any line being drawn through the shaft axis to intersect said pathway on opposite sides thereof will have two points of intersection with said path which are spaced from one another by a fixed distance, two lugs extending from the relatively movable element toward said surface each lug including a ball recess facing said surface, and a polished cam ball held between the recess in each of said lugs and the cam raceway, the shaft being adapted to urge toward each other said fixed element and said element having a surface with sufficient pressure to keep the cam balls captive between the cam raceway and the recesses and the polished balls captive between registered raceways.

ARNOLD KOLKS.

REFERENCES CITED

The following references are of record in the file of this patent:

UNITED STATES PATENTS

| Number | Name | Date |
| --- | --- | --- |
| 629,039 | Luitweiler et al. | July 18, 1899 |
| 1,362,700 | Huffman | Dec. 21, 1920 |
| 2,028,718 | Heine | Jan. 21, 1936 |
| 2,050,960 | Olivetti | Aug. 11, 1936 |